Feb. 20, 1923.
J. C. JUNKIN.
GRAIN SEPARATOR.
FILED MAR. 30, 1921.
1,445,957.
3 SHEETS—SHEET 1.
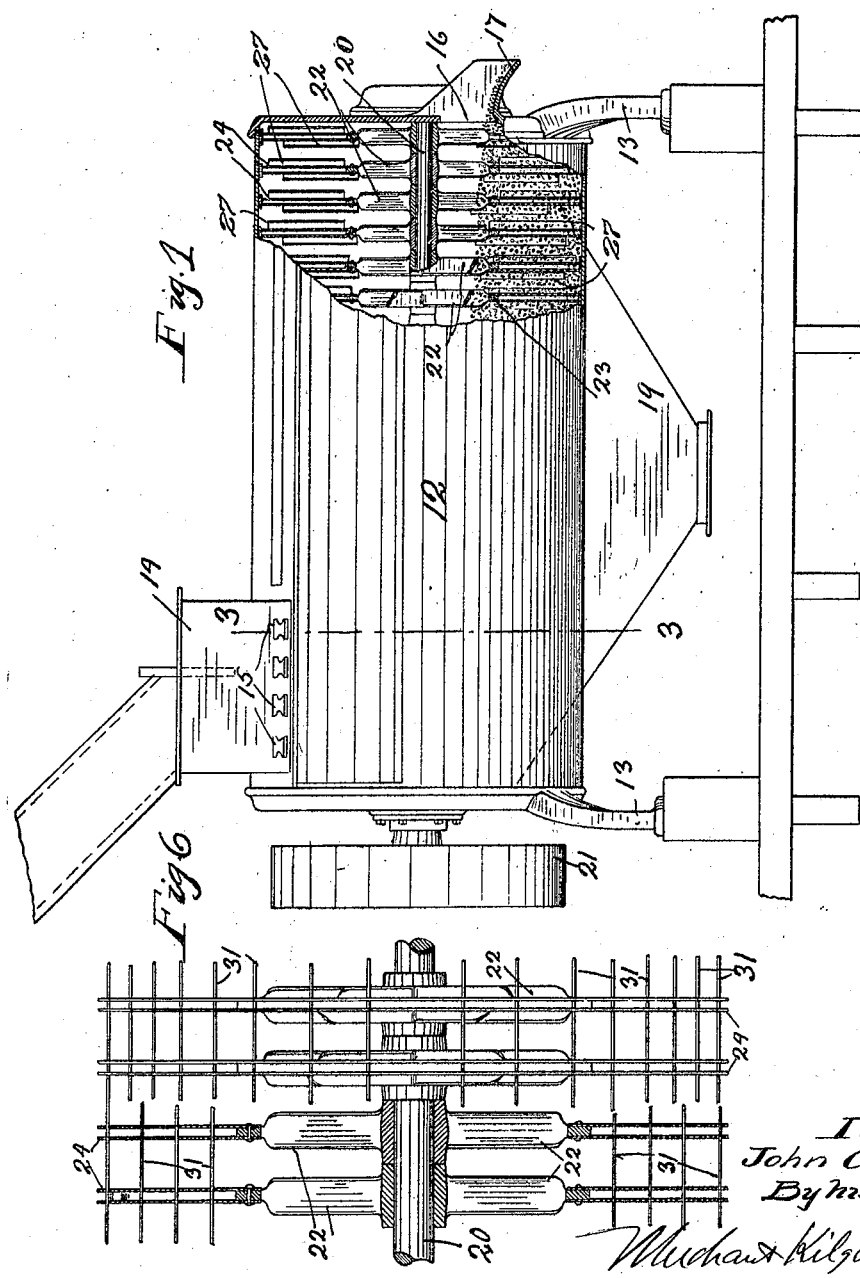
Inventor
John C. Junkin
By his Attorneys

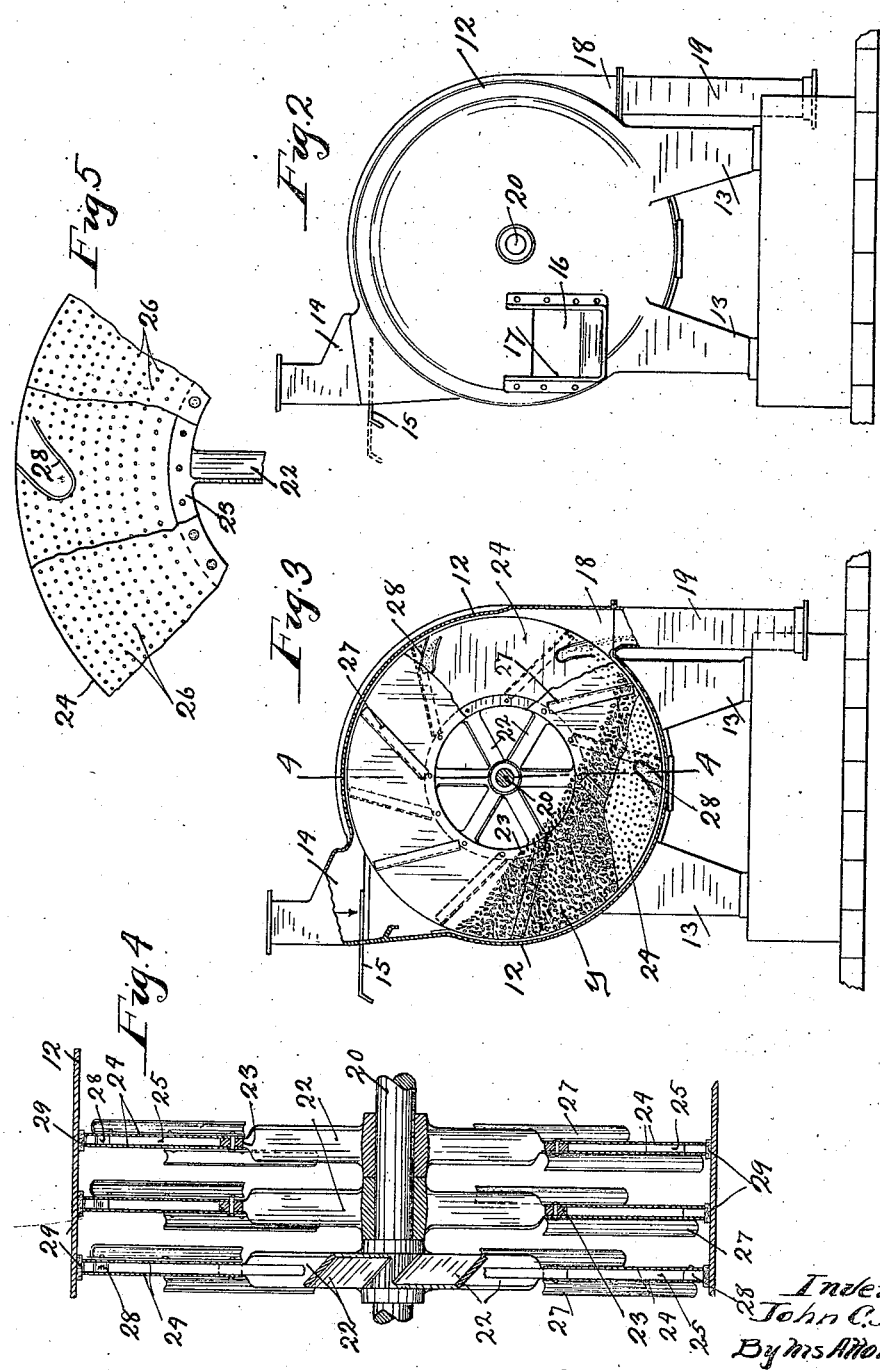

Feb. 20, 1923.
J. C. JUNKIN.
GRAIN SEPARATOR.
FILED MAR. 30, 1921.
1,445,957.
3 SHEETS—SHEET 3.
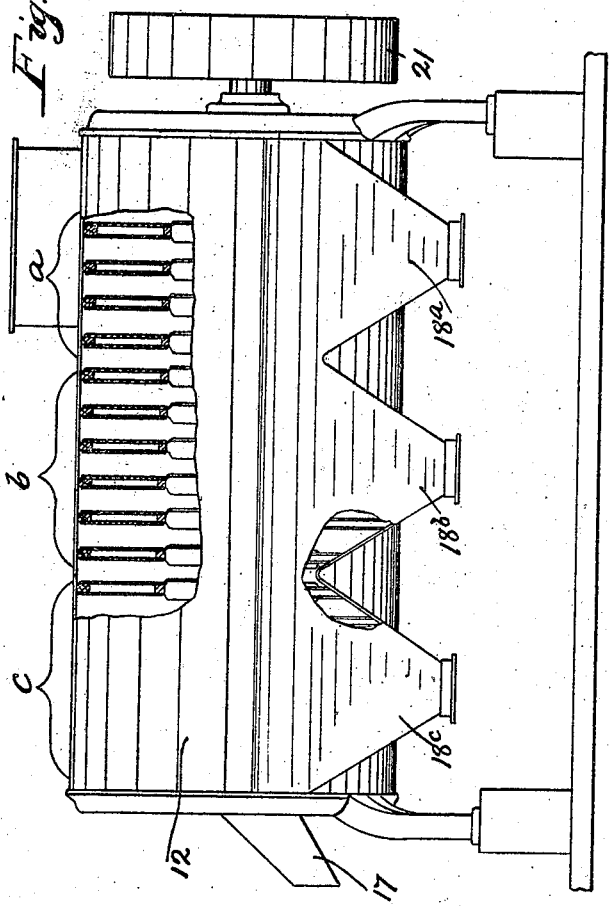
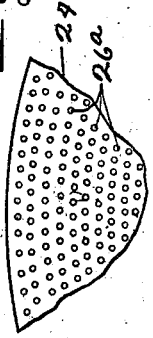
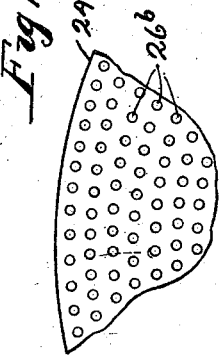
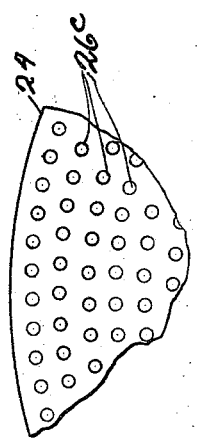
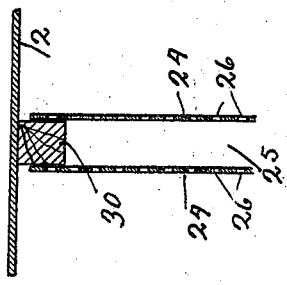
Inventor
John C. Junkin
By his Attorneys Patented Feb. 20, 1923.

1,445,957

UNITED STATES PATENT OFFICE.

JOHN C. JUNKIN, OF MINNEAPOLIS, MINNESOTA, ASSIGNOR TO CARTER MAYHEW MANUFACTURING COMPANY, OF MINNEAPOLIS, MINNESOTA, A CORPORATION OF MINNESOTA.

GRAIN SEPARATOR.

Application filed March 30, 1921. Serial No. 456,804.

*To all whom it may concern:*

Be it known that I, JOHN C. JUNKIN, a citizen of the United States, residing at Minneapolis, in the county of Hennepin and State of Minnesota, have invented certain new and useful Improvements in Grain Separators; and I do hereby declare the following to be a full, clear, and exact description of the invention, such as will enable others skilled in the art to which it appertains to make and use the same.

My invention relates to grain separators or separating machines of the general type disclosed and claimed in Letters Patent of the United States #1,364,247, issued to C. W. Carter of date January 4, 1921, and also disclosed and claimed in application filed by said C. W. Carter as inventor of even date herewith and entitled "Grain separators." The invention herein disclosed and claimed is in the nature of a modification of or improvement on the Carter separators and provides certain highly important improved features, all of which will be hereinafter described or illustrated and defined in the claims.

In the accompanying drawings, which illustrate the invention, like characters indicate like parts throughout the several views.

Referring to the drawings:

Fig. 1 is a view in side elevation, with some parts sectioned, showing the improved separator;

Fig. 2 is an elevation looking at the discharge end of the separator;

Fig. 3 is a transverse section taken approximately on the line 3—3 of Fig. 1;

Fig. 4 is an enlarged fragmentary section taken on the line 4—4 of Fig. 3;

Fig. 5 is a fragmentary view showing portions of one of the disk units;

Fig. 6 is a view corresponding substantially to Fig. 4, but illustrating a somewhat modified construction;

Fig. 7 is a side elevation, with some parts broken away and some parts sectioned, illustrating a modified form of the separator;

Fig. 8 is an enlarged fragmentary section showing portions of two disks forming part of the same disk unit; and Figs. 9, 10 and 11 are fragmentary views in elevation, illustrating the different sizes of the perforations in different groups of the disks used in Fig. 7.

In the Carter patent and application above identified, the separating surfaces on the disks there employed were preferably and specifically considered afforded by pockets that did not open completely through the disks. Otherwise stated, the Carter patent and application, in their broader aspects, were directed generically to disks or plates having separating surfaces that would receive certain kinds of grain or material and reject other kinds of grain or material, but were directed more especially to disks or plates having pockets that would receive the grain or material and discharge the same at the same side of the disk or plate.

My invention is directed particularly to disks or plates, the separating surfaces of which are formed with perforations, through which certain kinds of material, such as wheat, for example, will freely pass, while other kinds of materials, such as oats, for example, will be rejected. As a highly important feature of this invention, the perforated disks are arranged in pairs, each pair of disks affording what is designated as a disk unit. In this arrangement, the wheat or other materials passed through the perforations of the two disks from the opposite sides of the disk unit, will be delivered into the space between the two disks and, from such space, the selected material will be picked up or otherwise discharged so as to maintain the separation thus accomplished.

Of course, this separator is capable of use for separating various different kinds of grains or seeds or other materials, but it will first be described as designed and used for the separation of wheat from oats and handling commingled grains frequently designated as "succotash."

As a suitable container for such material, I provide a horizontally disposed drum-like casing 12, which may be conveniently supported by legs 13. At or near its receiving end, the casing 12 is provided with an inlet or supply hopper 14 equipped in its bottom with feed-controlling means, such as independently movable gates 15. At the delivery end of the casing is a discharge passage 16 located at one side and at a point far above the body of the casing and through which, as will hereinafter appear, the oats or rejected grain will be ultimately discharged. The passage 16, as shown, delivers to a discharge spout 17. At one side of the casing is a longitudinally extended tangential depending collecting hopper 18 that delivers to a discharge spout 19.

Mounted in suitable bearings on the heads of the casing and extended axially therethrough, is a horizontal shaft 20, which, at one end, is shown as provided with a pulley 21 for rotating the same through a power-driven belt not shown. This shaft 20 carries a multiplicity of sets of radial arms in the form of obliquely set propelling blades 22, each set being, as shown, rigidly connected to an annular rim 23.

The disks 24, which belong to or make up the same disk unit, are, at their inner edges, riveted or otherwise rigidly secured to the respective rims 23 and are concentrically located in respect to the shaft 20. Thus, the two disks of the units are spaced to afford annular chambers 25 between them. These disks are formed with perforations 26, which, for the separation of wheat from oats, should be large enough to permit wheat to pass freely therethrough when subjected to slight pressure, such as produced against the faces of the disks as they are moved through the body or mass of commingled grain or succotash $y$.

The numeral 27, Figs. 1, 3 and 4, indicates agitating cleats or strips secured on the faces of the disks 24, and the numeral 28, Figs. 3, 4 and 5, indicates collecting cups or pockets secured to the inner faces of the unit-forming disks near the peripheries thereof. In Figs. 1, 3 and 4, the numeral 29 indicates pliable joint strips applied to the interior of the casing 12 and against which the peripheral edges of the disks are arranged to run to thereby prevent the wheat, which enters the chambers 25, from escaping back into the mass of commingled grain. In the drawings, the agitating cleats 27 are exaggerated in transverse width and probably are shown in greater number than would be actually required.

The construction so far specifically described is that illustrated in Figs. 1 to 5, inclusive, and the operation thereof, when designed for use in separation of wheat from oats, is substantially as follows:

The disks will be rotated in clockwise direction in respect to Figs. 3 and 5, and under such rotation, the upper portion of the commingled stock $y$ will be slowly but progressively fed by the blades 22 through the openings in the disks in a direction from the receiving toward the delivery end of the casing, and the oats will finally be discharged through the passage 16 and spout 17. The oats, under rotation of the disks, will naturally be turned flatwise against the disks and, being too long to pass laterally through the perforations 26 thereof, will be rejected by the disks, while the wheat will pass quite freely through the perforations and into the chambers or spaces 25 between the disks of the several disk units. The good wheat thus collected in said chambers or spaces 25 will be picked up by the pockets or cups 28 and carried upward and over and discharged into the collecting hopper 18 and discharged through the spout 19. The oats will be progressively moved onward and finally discharged, as stated, through the passage 16. Thus, the separation of wheat and oats is effectually accomplished. Of course, by providing the disks with the proper sized perforations, the separator can be designed for the separation of various other kinds of seed, grains or materials.

In Figs. 7 to 11, inclusive, I have shown a separator, which, generally stated, is of the same character as that already described, but which is designed for effecting several different kinds of separation in the same machine. Here, the casing 12 is provided with a plurality, as shown three, longitudinally spaced collecting hoppers $18^a$, $18^b$ and $18^c$, and the disk units are correspondingly arranged in three groups, $a$, $b$ and $c$. These disk units are or may be of the same construction as already described, but the group $a$ will deliver to the hopper $18^a$, the group $b$ will deliver to the hopper $18^b$, and the group $c$ will deliver to the hopper $18^c$. Also, the disks 24 of group $a$ have perforations $26^a$, not large enough to pass wheat or large seeds, but only large enough to pass small seed; the disks of group $b$ have perforations $26^b$, not large enough to pass wheat, but large enough to pass quite large seeds; and the disks of group $c$ have perforations $26^c$ large enough to pass wheat but not large enough to pass oats or barley laterally therethrough. With this arrangement, small seeds will be delivered into the hopper $18^a$, large seeds or broken wheat, for example, will be delivered into the hopper $18^b$, good wheat will be delivered into hopper $18^c$; and the oats will be discharged from the spout 17.

What I claim is:

1. The combination with a container for material to be separated, of a plurality of perforated separating plates movable upward through the material in said container, and through the perforations of which plates certain kinds of material are adapted to pass, means for collecting the materials passed through the perforations of said plates and for removing the same from the unseparated mass.

2. The structure defined in claim 1 in further combination with means for progressively feeding the commingled material from the one plate to the other.

3. The structure defined in claim 2 in which said container is provided at one side of the receiving hopper into which is delivered the material separated from the mass by having passed through the perforations of the separating plates.

4. The combination with a container for material to be separated, of a plurality of rotary disks having separating surfaces formed by perforations through which only certain kinds of material may pass, said disks having feed passages located therein radially inward of their separating surfaces, and means for progressively feeding the commingled material through the feed passages of the several disks.

5. The combination with a container for material to be separated, of a plurality of rotary disks having separating surfaces formed by perforations through which only certain kinds of material may pass, said disks having feed passages located therein radially inward of their separating surfaces, means for progressively feeding the commingled material through the feed passages of the several disks, and means for collecting and maintaining the separation of material passed through the perforations of said disks.

6. The combination with a container for material to be separated, of a plurality of rotary disks having separating surfaces formed by perforations through which only certain kinds of material may pass, said disks having feed passages located therein radially inward of their separating surfaces, means for progressively feeding the commingled material through the feed passages of the several disks, and means for collecting and maintaining the separation of material passed through the perforations of said disks, said disks being arranged in groups, the different groups having perforations of different sizes whereby different materials will be passed through the perforations of the disks of different groups and independently collected.

7. The combination with a container for material to be separated, of a plurality of disks rotatably mounted therein, said disks having perforations through which only certain kinds of material may pass, means for progressively subjecting the commingled stock to the separating surfaces of the several disks, said disks being arranged in groups and the perforations of the disks of different groups being of different sizes so that different kinds or grades of material will pass therethrough, and means for maintaining the separation of material passed through the several disks.

8. In a separator of the kind described, the combination with a container for material to be separated, of a rotary disk unit made up of two adjacent laterally spaced disks connected to rotate together and having perforations through which only certain kinds of material may pass into the space between said disks.

9. In a separator of the kind described, the combination with a container for material to be separated, of a rotary disk unit made up of two laterally spaced disks connected to rotate together and having perforations through which only certain kinds of material may pass into the space between said disks, and means in the space between said disks for discharging the selected material to maintain the separation thereof.

10. In a separator of the kind described, the combination with a container for material to be separated, of a rotary disk unit made up of two laterally spaced disks having perforations through which only certain kinds of material may pass into the space between said disks, and pick-up devices located between and carried with said disks for discharging, from the space between disks, material passed through the perforations of said disks.

11. The combination with a container for material to be separated, of a shaft extended through said container, a plurality of annular disk units surrounding said shaft, and propeller-acting arms connecting said disk units to said shaft, each disk unit comprising two perforated disks, and means located between the disks of said disk units and operative to gather up and deliver from the commingled mass the materials passed through the perforations of said disks.

12. The combination with a container for material to be separated, of a shaft extended through said container, a plurality of annular disk units surrounding said shaft, propeller-acting arms connecting said disk units to said shaft, each disk unit comprising two perforated disks, a collecting hopper at one side of said casing, and pick-up devices located between the disks of the several units, carried thereby and operative to discharge, into said collecting hopper, material passed through the perforations of said disks.

In testimony whereof I affix my signature.

JOHN C. JUNKIN.